United States Patent

McCann et al.

[11] Patent Number: 4,507,773

[45] Date of Patent: Mar. 26, 1985

[54] HIGH EFFICIENCY PRECISION LASER BEAM SWITCH

[75] Inventors: James T. McCann, Collingswood; Lawrence W. Dobbins, Woodlynne; Charles W. Reno, Cherry Hill, all of N.J.

[73] Assignee: RCA Corporation, New York, N.Y.

[21] Appl. No.: 426,089

[22] Filed: Sep. 28, 1982

[51] Int. Cl.$^3$ .............................................. G11B 7/00
[52] U.S. Cl. .................................. 369/110; 369/121; 358/342
[58] Field of Search ................. 369/32, 110, 119, 121; 358/342; 350/370, 380

[56] References Cited

U.S. PATENT DOCUMENTS

| | | | |
|---|---|---|---|
| 3,432,223 | 3/1969 | Uchida | 350/150 |
| 3,713,722 | 1/1973 | Maria Mes | 350/150 |
| 3,956,626 | 5/1976 | Ross | 250/199 |
| 4,097,895 | 6/1978 | Spong | 358/128 |
| 4,222,071 | 9/1980 | Bell et al. | 358/128 |
| 4,387,452 | 6/1983 | Bricot et al. | 369/32 |

Primary Examiner—Robert L. Richardson
Attorney, Agent, or Firm—Joseph S. Tripoli; George E. Haas; George J. Seligsohn

[57] ABSTRACT

An optical beam switch is provided in a multiple beam optical disc record and playback system. Current systems for very high data rate optical disc mass memory apparatus include requirements for near-continuous recording of data using two separate turntables in a single apparatus. To reduce cost and complexities in the system as well as power requirements, the optical system includes a beam switch that allows a single record laser and modulator to be shared between two turntables. In accordance with the system a half-wave plate is shifted into and out of the beam path to effect polarization change of the light beam. A polarizing beam splitter, which follows the half-wave plate in the beam path, shifts the light beam in one of two directions depending upon the polarization of the light beam or, in other words, the position of the half-wave plate.

4 Claims, 2 Drawing Figures

HIGH EFFICIENCY PRECISION LASER BEAM SWITCH

The government has rights in this invention pursuant to a government contract.

BACKGROUND OF THE INVENTION

The present invention relates generally to apparatus for optically reading and recording high density information, digital or analog, on the surface of a record medium and, more particularly, to apparatus for optically reading and recording data at extremely high data rates, for example, where a plurality of light beams are used to record information simultaneously in multiple tracks.

High density optical disc recording systems which may be used for recording and playing back information are known in the prior art. For example, U.S. Pat. No. 4,097,895 (Spong) describes an optical disc record-playback system wherein data is recorded in the form of pits in an absorbtive coating on the surface of an optical disc. In the Spong system, approximately $10^{11}$ bits of information can be stored on one side of a disc-shaped record medium having a 30 cm diameter.

Optical disc data storage systems are also known where the rate at which the information is recorded or played back is increased two, three or more times over a Spong type system by recording and playing back multiple tracks of information simultaneously. In U.S. patent application Ser. No. 288,550 of C. W. Reno, filed July 30, 1981, a multiple beam optical record and playback apparatus is described. In the Reno apparatus, a single light beam from a radiation source is split into a plurality of read and record beams. Each of the record beams which is focused to a diffraction limited spot is individually modulated by the recording signals. Data is recorded as a disturbance on the surface of the disc along a plurality of spiral tracks.

Current optical discs data storage systems for very high data rate mass memory systems include requirements for near-continuous recording of data using two separate turntables in a single machine. In such systems the data is received for a period of time that is greater than the time necessary to fill a single disc. Therefore, a first disc is filled, then a second, followed by a third, and so on until the stream of information stops. In light of this, to reduce costs and complexities in such a system, as well as power requirements, an optical system is provided that allows the record laser and modulator used for single turntable systems to be shared with a second turntable. These systems require a switch to redirect a high powered laser beam from one turntable to another with high efficiency, speed and reliability as well as beam pointing accuracy. In practice the switch device must be capable of switching a high power laser beam (approximately 1-10 watts) with an efficiency of 98% or greater. In operation, the switch should operate very rapidly, typically less than 5 milliseconds.

Prior art techniques of switching laser beams are unsatisfactory for one reason or another. For example, a galvanometer controlled mirror may be used to switch a laser beam from one position to another, however, the galvanometer has a tendency to drift out of position unless the arrangement is provided with precision stops. Further, the galvanometer controlled mirror is very sensitive to mirror angular misalignment and extremely sensitive to vibrations.

Another technique known in the prior art is to use a mirror or glass plate interposed in the beam path to redirect a laser beam. In general, mirrors or glass plates are much too slow for the high data rate systems described herein, typically it takes 10 to 20 milliseconds for the beam to switch. Further, the reliability of such a mechanical system is very low. Also, they are very sensitive to position. For example, with respect to a mirror the light reflected by the mirror is deflected by twice the angle of the mirror, thus the misalignment is twice the angular deviation of the mirror. With respect to a glass plate the glass plate would have to be very thick to provide adequate beam displacement. Since the beams lateral displacement through a glass plate is proportional to the thickness, for a given angle, the glass plate has a very high sensitivity to angle changes. Angular misalignment is a prime concern in this system because the output beams must be very stable. Another problem associated with a mirror or glass plate is that they may be temperature sensitive.

An acousto-optic modulator is not suitable for a laser beam switch. The optical efficiency of such a system is very low, on the order of 70%. Another problem is that the deflection angle of such a system is very small, typically on the order of 10-30 milli-radians. Further, an acousto-optic modulator is fairly complex because it requires a long throw or the use of other optics to allow pick off of the diffracted beam. Also, the focused spot may create energy densities that would destroy anti-reflection coatings on optical elements. One other drawback of the acousto-optic modulator is that the drive electronics are generally complicated.

A fourth technique used in the prior art for beam switching is the use of an electro-optic modulator. Electro-optic modulators are very expensive and very bulky. Further, they are extremely temperature sensitive. To avoid the bulkiness of such a modulator a very large half-wave voltage must be used. But in this regard, high voltages are being traded for large crystals.

SUMMARY OF THE INVENTION

In accordance with the principles of the present invention a high efficiency precision laser beam switch is provided which obviates the problems of the prior art beam switches.

In accordance with one aspect of the present invention, a multiple beam optical data processing system for use in recording or retrieving information recorded in tracks is provided. The system includes first and second turntables for recording information in a near-continuous operation. A source of information signals provides a first stream of continuous data. A light beam modulated with the information signals is included in the system. Further, the system includes switch means for switching the light beam from the first turntable to the second turntable to effect near-continuous recording.

In accordance with another aspect of the present invention, the switch means includes polarizing means for effecting a polarization change of the light beam and an actuator means for linearly moving the polarizing means. The actuator moves the polarizing means in a linear manner such that the polarizing means is switched into and out-of the light beam path. Additionally, the means for switching includes means for directing, in response to the position of the polarizing means, the light beam in first and second directions such that the light beam follows a first predetermined path when the polarizing means is in the light beam path and follows a second predetermined path when the polarizing means is out-of the light beam path.

BRIEF DESCRIPTION OF THE DRAWING

Other features and advantages of the invention will be more fully understood from the following detailed description of the preferred embodiment, the appended claims and the accompanying drawing in which:

DESCRIPTION OF THE PREFERRED EMBODIMENT

Figure 1:
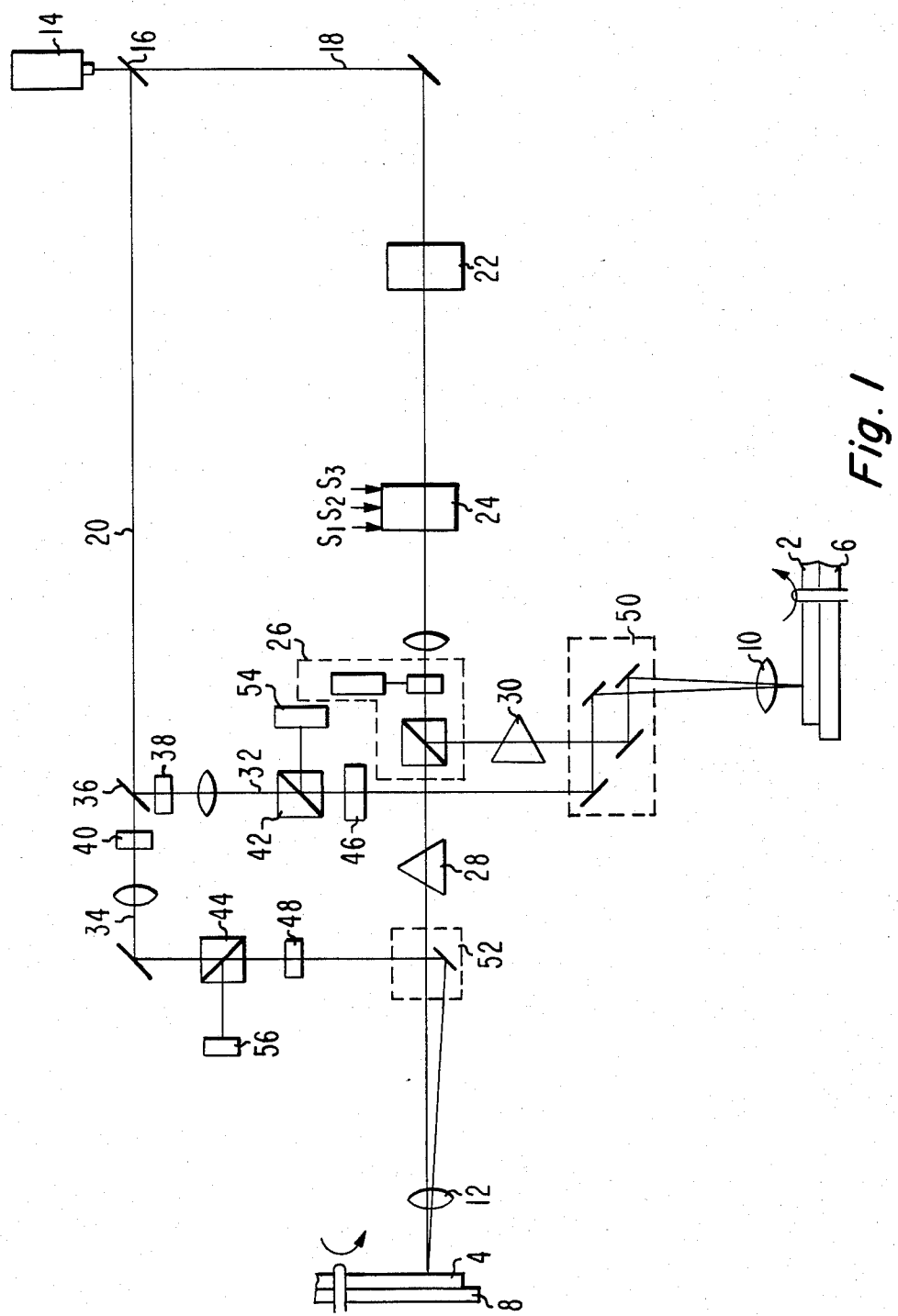
FIG. 1 illustrates a multiple beam optical record and playback apparatus in accordance with the principles of the present invention.

In accordance with the embodiment of FIG. 1, data are recorded in precisely located tracks for rapid retrieval. Recording is achieved on a light sensitive disc onto which data are generally permanently recorded. Data recording is generally effected by ablation, melting or some change in state of a portion of the surface of discs 2 and 4. The recording is effected by the thermal effects of a laser beam on the surface of discs 2 and 4. The exact mechanism of recording is not known. The recorded information is available immediately without further processing. Illustratively, discs 2 and 4 are formed having a light sensitive surface upon which ablative recording by the thermal effects of a focused laser beam may be made. For example, a preferred disc for ablative recording may be of a type described in U.S. Pat. No. 4,222,071 issued in the name of A. E. Bell et al.

To provide optical scanning of discs 2, 4, transport stages (not shown) are provided to linearly move the focused light beam across the disc surface at a rate in accordance with the requirements of the desired recording or playback mode while disc 2 and 4 are rotated on turntables 6 and 8, respectively. The transport is provided such that the impinging light beams which are focused to light spots by lenses 10 and 12, respectively, are guided along a selected path on the surface of disc 2 and 4 (e.g., spiral track).

In operation, the light output of light source 14 (illustratively, an argon-type laser emitting a monochromatic light beam of a wavelength of 488 nm) is split by beam splitter 16 into a record beam 18 and a play beam 20 (illustratively, 95% of the light power from laser 14 passes through splitter 16 in a record beam path 18 and 5% is reflected in a play beam path 20). Record beam 18 passes through to beam splitter 22. Beam splitter 22 efficiently divides the single record beam into a plurality of separate, equal amplitude, co-planar beams (illustratively, three beams may be split by beam splitter 22). Illustratively, beam splitter 22 may comprise a phase grating for splitting the single beam into three equal amplitude beams. Only one of the light beam produced by beam splitter 22 is shown. The equal amplitude beams are then passed through multi-channel modulator 24 which independently impresses each beam with the information S1, S2, S3 to be recorded. The plurality of beams which are modulated in accordance with the incoming information pass through beam switch 26 which directs the beams either toward turntable 8 or turntable 6. The operation of beam switch 26 will be explained herein. The plurality of beams which are switched either to disc 4 or disc 2 pass through dove prisms 28, 30, respectively. Dove prisms 28 and 30 provide a technique for adjusting the spacing of the spots which fall on disc 4 or disc 2. Illustratively, reference may be made to U.S. patent application Ser. No. 361,220 filed on Mar. 24, 1982, in the name of C. W Reno for an explanation of the operation of dove prisms 28 and 30.

The play beam 20 is split by beam splitter 36 into two beam paths 32 and 34 to pass through the play beam optics to disc 2, 4, respectively. Play beam 32 is reflected by half silvered mirror 36 to pass through play beam splitter 38. Play beam 32 passes through beam splitter 38, which may be of a type described in detail in the aforementioned Reno application, where it is efficiently divided into a plurality of separate, equal amplitude, co-planar beams (illustratively, three beams). Similarly, play beam 34 passes through mirror 34 to play beam splitter 40 where it is split into a plurality of equal amplitude, co-planar beams. The polarization of the low power play beams in beam paths 32 and 34 is set to allow them to pass through polarizing beam splitters 42 and 44, respectively, on a first pass. The beams in paths 32, 34 pass through quarter wave plates 46, 48, respectively, to beam combiners 50, 52, respectively. In beam combiners 50, 52, the modulated record beams are merged with the low power play beams. Beam combiners 50, 52 align the record and play beams so that they can be passed through a common optical system to the disc surfaces.

The beams from combiners 50, 52 are reflected by the surfaces of discs 2, 4, respectively. The play beams are focused and aligned in the beam combiners so that they are incident on the disc in line with the recorded information tracks at a point where they allow readout of the data just after recording (illustratively, the play spots are positioned to land approximately 40 $\mu$m behind the record spots).

Beam splitters 38 and 40 may comprise a combination of a phase grating and an acousto-optic modulator. In this arrangement, the phase grating splits the single incoming beam into a plurality of, e.g., three equal amplitude, co-planar beams. The three co-planar beams are incident on the acousto-optic modulator which is used to deflect all three beams. The electrical signal which is used to drive the acousto-optic modulator is frequency modulated such that the beam spots formed on the disc surface exhibit periodic excursions in a direction perpendicular to the track. Thus, the play beams may be used for tracking purposes. Illustratively, beam splitters 38 and 40 may be of a type described in the aforementioned Reno application.

Light from the playback spots is reflected by the recorded pits on the disc and passed back through the optical systems to the polarizing beam splitters 42, 44. At this point, the light polarization of the playback light beams has been retarded by half a wave (i.e., 2 passes through quarter wave plates 46, 48) such that beam splitters 42, 44 direct the light to the multi-element detector arrays 54, 56. The changes in disc reflectivity introduced during the recording are converted into electrical signals representative of the recorded information, i.e., $S_1$, $S_2$, $S_3$, respectively. Playback during record is used to verify that the information recorded has been recorded properly. When errors are detected, the data is rerecorded until no errors are present. In normal playback the data signals from detectors 54 and 56 are delivered to suitable processing electronics (not shown) for signal processing.

Figure 2:
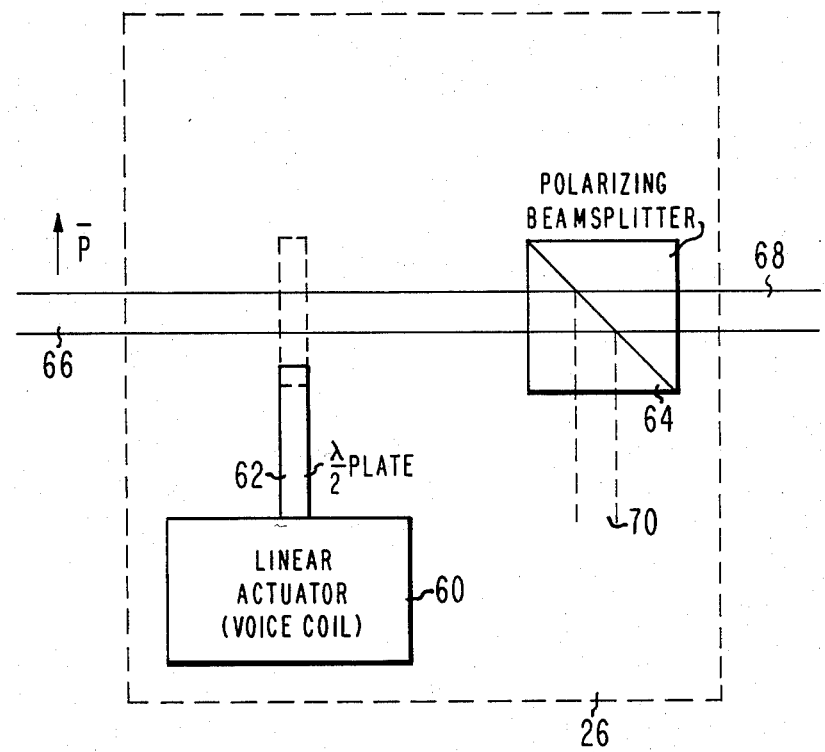
FIG. 2 shows the beam switch arrangement of FIG. 1 which is provided in accordance with the present invention.

The operation of the beam switching apparatus 26 of FIG. 1 will now be explained with reference to FIG. 2. Referring to FIG. 2, beam switch 26 comprises a linear actuator 60, half-wave plate 62 and polarizing beam splitter 64. The operation of beam switch 26 is as follows. An input light beam 66 is provided having a first linear polarization (illustratively, the polarization direction is shown by the vector $\bar{P}$). When half-wave plate 62 is not interposed in the beam path, the input beam 66 passes directly into polarizing beam splitter 64 and emerges out of the other side as beam 68. On the other hand, when half-wave plate 62 is moved by linear actuator 60 such that half-wave plate 62 is interposed into the path of beam 66 the polarization of beam 66 emerging from half-wave plate 62 is rotated by 90°. It will be noted to those of skill in the art that by properly orienting the crystalline axis of half-wave plate 62 the linear polarization $\bar{P}$ of light beam 66 may be shifted 90° as beam 66 passes through half-wave plate 62. Beam 66 with polarization rotated 90° is incident upon polarizing beam splitter 64. With the polarization rotated 90° polarizing beam splitter deflects beam 66 such that it emerges as beam 70 in a direction orthogonal to the original direction of beam 66 (i.e., beam 68). Thus, by linearly moving half-wave plate 62 in and out of laser beam path 66 the beam may be caused to switch from the position of beam 68 to that of beam 70.

This beam switching device of FIG. 2 is superior to prior art systems which would insert or rotate a mirror in the laser beam path to switch the beam position. Prior art systems employing mirrors have to control the position and angle of the mirror much more accurately than the position of the wave plate 62 has to be maintained. In accordance with the system of FIG. 2, half-wave plate 62 is linearly moved in and out of the laser beam path. In the position where the wave plate is not in the beam, the exact position and angle of the wave plate is not a factor. In the position where the wave plate is in the beam, the linear motion will be greater than the laser beam diameter so that the exact linear position is not critical. The sensitivity to angular misalignment is very much less than systems employing a mirror or glass plate.

Another important advantage of the beam switching device of FIG. 2 is its reliability. The linear actuator 60 may be implemented by using a voice coil similar to that used in loud speaker mechanisms. It is well known that these mechanisms can operate many times without failure.

Since half-wave plate 62 is a small glass structure its mass is minimal, thus the actuator can accelerate very rapidly. This allows a very fast response time when compared to prior art systems. For example, beam switching of 5 milliseconds is not unreasonable. Although the recording will not be continuous during some period of time while the switch is activated, since the switching time is so short the data transmitted during that period of time may be stored in a buffer. This system is superior to other mechanical switching systems wherein large blocks of data may be lost.

Another advantage of the system of FIG. 2 is its high efficiency. A high powered laser beam may be switched with efficiencies of 98% or greater. Further, the drive electronics of the system are very simple compared to an acousto-optic or electro-optic modulator that may be used for a beam switch.

Other embodiments of the invention will be apparent to those skilled in the art. For example, the half-wave plate of FIG. 2 may be interposed in the beam path at all times and rotated 45° to effect the 90° polarization shift. It is felt, however, that such a technique would not be as fast as that disclosed in FIG. 2. Further, it should be noted that the polarizing beam splitter 64 of FIG. 2 may effect beam switching of less than 90°.

What is claimed is:

1. In a multiple beam optical data processing system for use in recording or retrieving information recorded in tracks, wherein said system includes first and second turntables for recording information in a near-continuous operation, a source of information signals provides a first stream of continuous data, an apparatus comprising a light beam modulated with said information signals, and switch means for switching said light beam from said first turntable to said second turntable to effect near-continuous recording; wherein said means for switching includes:

polarizing means for effecting a polarization change of said light beam;

actuator means for linearly moving said polarizing means to move said polarizing means in a linear manner such that said polarizing means is positioned in first and second positions, being positioned in said light beam path and out of said light beam path; and directing means for directing said light beam in first and second directions such that said light beam follows a first predetermined path when said polarizing means is in said first position and follows a second predetermined path when said actuator means is in said second position.

2. The apparatus according to claim 1 wherein said polarizing means is a half-wave plate.

3. The apparatus according to claim 2 wherein said actuator means is a voice coil.

4. The apparatus according to claim 3 wherein said directing means comprises a polarizing beam splitter.

* * * * *